US011815009B2

(12) United States Patent
Inoue et al.

(10) Patent No.: US 11,815,009 B2
(45) Date of Patent: Nov. 14, 2023

(54) FORCED-INDUCTION DEVICE

(71) Applicant: TOYOTA JIDOSHA KABUSHIKI KAISHA, Toyota (JP)

(72) Inventors: Yasuko Inoue, Toyota (JP); Takashi Tsukiyama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/168,649

(22) Filed: Feb. 14, 2023

(65) Prior Publication Data

US 2023/0287829 A1 Sep. 14, 2023

(30) Foreign Application Priority Data

Mar. 9, 2022 (JP) ................................ 2022-036094

(51) Int. Cl.

| | |
|---|---|
| ***F02B 37/02*** | (2006.01) |
| ***F02B 75/20*** | (2006.01) |
| ***F02B 75/08*** | (2006.01) |
| *F02B 75/18* | (2006.01) |

(52) U.S. Cl.

CPC ............ *F02B 37/025* (2013.01); *F02B 75/20* (2013.01); *F02B 2075/1816* (2013.01)

(58) Field of Classification Search

CPC ..................................................... F02B 37/025

See application file for complete search history.

(56) References Cited

FOREIGN PATENT DOCUMENTS

| | | | | | |
|---|---|---|---|---|---|
| DE | 112015001237 | B4 * | 6/2021 | ............. | F01D 25/24 |
| JP | H0242136 | A * | 2/1990 | | |
| JP | 2013-2302 | A | 1/2013 | | |
| JP | 2021-134719 | A | 9/2021 | | |
| WO | WO-2012034347 | A1 * | 3/2012 | ............. | F01D 9/026 |

OTHER PUBLICATIONS

"What Is Engine Firing Order? Why Is It Important?" CarBikeTech, https://web.archive.org/web/20210618123041/https://carbiketech.com/engine-firing-order/. Accessed on May 12, 2021.*

* cited by examiner

*Primary Examiner* — Ngoc T Nguyen
(74) *Attorney, Agent, or Firm* — Oblon, McClelland, Maier & Neustadt, L.L.P.

(57) ABSTRACT

A forced-induction device includes a turbine wheel, a turbine housing, and a connection pipe. The connection pipe includes a partition wall that partitions the inside of the connection pipe into a first passage and a second passage. When a cross section orthogonal to a rotation axis of the turbine wheel is viewed, a line segment extending from the distal end of the partition wall toward the upstream side in the flow direction of exhaust gas and defining a boundary between the first passage and the partition wall is a first downstream line segment. A line segment extending from the distal end of the partition wall toward the upstream side in the flow direction of exhaust gas and defining a boundary between the second passage and the partition wall is a second downstream line segment. The first downstream line segment and the second downstream line segment are parallel to each other.

4 Claims, 3 Drawing Sheets

FORCED-INDUCTION DEVICE

BACKGROUND

1. Field

The present disclosure relates to a forced-induction device.

2. Description of Related Art

Japanese Laid-Open Patent Publication No. 2021-134719 discloses a turbine housing of a forced-induction device. The turbine housing includes a turbine scroll chamber. The turbine scroll chamber communicates with an exhaust gas introduction passage.

In the turbine housing, exhaust gas preferably flows smoothly from the exhaust gas introduction passage into the turbine scroll chamber.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a forced-induction device for an internal combustion engine is provided. The internal combustion engine includes a first cylinder and a second cylinder having a different timing of a combustion stroke from the first cylinder, and a first exhaust port connected to the first cylinder and a second exhaust port connected to the second cylinder. The forced-induction device includes a turbine wheel, a turbine housing that accommodates the turbine wheel, and a connection pipe that connects the turbine housing and the internal combustion engine to each other. The connection pipe includes a contact surface that is in contact with the internal combustion engine, a first passage communicating with the first exhaust port, a second passage communicating with the second exhaust port, and a partition wall extending from the contact surface and partitioning an interior of the connection pipe into the first passage and the second passage. The turbine housing includes a scroll passage extending in a circumferential direction of the turbine wheel between an inner wall of the turbine housing and an outer circumferential surface of the turbine wheel. The scroll passage communicates with the first passage and the second passage such that exhaust gas that has passed through the first passage and exhaust gas that has passed through the second passage merge with each other. A specified cross section is defined as a cross-section orthogonal to a rotation axis of the turbine wheel and having a largest cross-sectional flow area of the scroll passage. When the specified cross section is viewed, the following arrangement is achieved: a line segment extending from a distal end of the partition wall toward an upstream side in a flow direction of exhaust gas in the first passage and defining a boundary between the first passage and the partition wall is a first downstream line segment; and a line segment extending from the distal end toward an upstream side in a flow direction of exhaust gas in the second passage and defining a boundary between the second passage and the partition wall is a second downstream line segment. The first downstream line segment and the second downstream line segment are parallel to each other.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, “at least one of A and B” should be understood to mean “only A, only B, or both A and B.”

Hereinafter, a forced-induction device 10 according to one embodiment will be described.

<Internal Combustion Engine 30>

Figure 1:
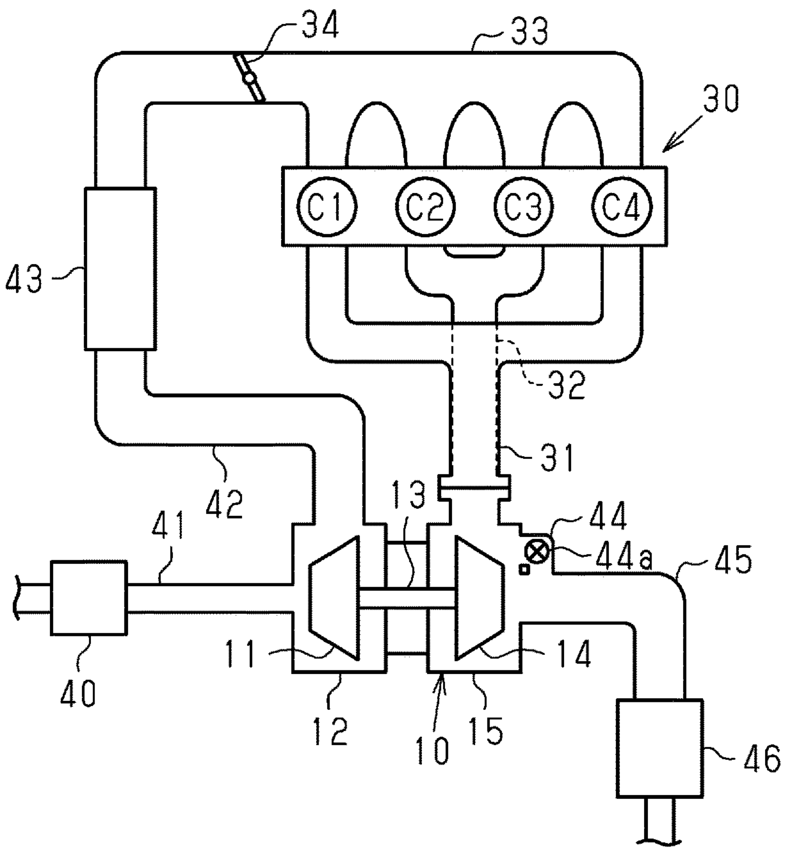
FIG. 1 is a schematic diagram showing an intake and exhaust system of an internal combustion engine including a forced-induction device according to an embodiment.

As shown in FIG. 1, an internal combustion engine 30 includes an intake manifold 33, four cylinders C1, C2, C3, C4, a first exhaust port 31, and a second exhaust port 32.

The intake manifold 33 has four branched passages in a downstream portion, and the branched passages communicate with the cylinders C1 to C4, respectively. A throttle valve 34 is provided upstream of the four branched passages in the intake manifold 33.

The cylinders C1, C2, C3, and C4 are arranged side by side in that order. An intake stroke, a compression stroke, a combustion stroke, and an exhaust stroke occur in each of the cylinders C1 to C4 in that order. When the cylinder C1 is in the intake stroke, the cylinder C2, the cylinder C3, and the cylinder C4 are in the compression stroke, the exhaust stroke, and the combustion stroke, respectively. When the cylinder C1 is in the compression stroke, the cylinder C2, the cylinder C3, and the cylinder C4 are in the combustion stroke, the intake stroke, and the exhaust stroke, respectively. When the cylinder C1 is in the combustion stroke, the cylinder C2, the cylinder C3, and the cylinder C4 are in the exhaust stroke, the compression stroke, and the intake stroke, respectively. When the cylinder C1 is in the exhaust stroke, the cylinder C2, the cylinder C3, and the cylinder C4 are in the intake stroke, the combustion stroke, and the compression stroke, respectively.

The cylinders C1 and C4 are first cylinders that communicate with the first exhaust port 31. The cylinders C2 and C3 are second cylinders that communicate with the second exhaust port 32. As described above, the first cylinders and the second cylinders are different in the timing of the combustion stroke. The cylinders C1 and C4 may be referred to as an N1 cylinder and an N3 cylinder, respectively. The cylinders C2 and C3 may be referred to as an N4 cylinder and an N2 cylinder, respectively. The combustion stroke occurs in the order of the cylinder C1, the cylinder C3, the cylinder C4 and the cylinder C2. That is, the combustion stroke occurs in the order of the N1 cylinder, the N2 cylinder, the N3 cylinder, and the N4 cylinder.

<Intake and Exhaust System of Internal Combustion Engine 30>

An outline of an intake and exhaust system of the internal combustion engine 30 will be described with reference to FIGS. 1 and 2.

As shown in FIG. 1, the intake and exhaust system of the internal combustion engine 30 includes an air cleaner 40, a first intake passage 41, the forced-induction device 10, a second intake passage 42, an intercooler 43, an exhaust passage 45, and a three-way catalyst 46.

The air cleaner 40 is connected to the forced-induction device 10 by the first intake passage 41. The forced-induction device 10 is connected to the intercooler 43 by the second intake passage 42. The intercooler 43 is connected to the intake manifold 33 of the internal combustion engine 30. The first exhaust port 31 and the second exhaust port 32 are connected to the forced-induction device 10.

Figure 2:
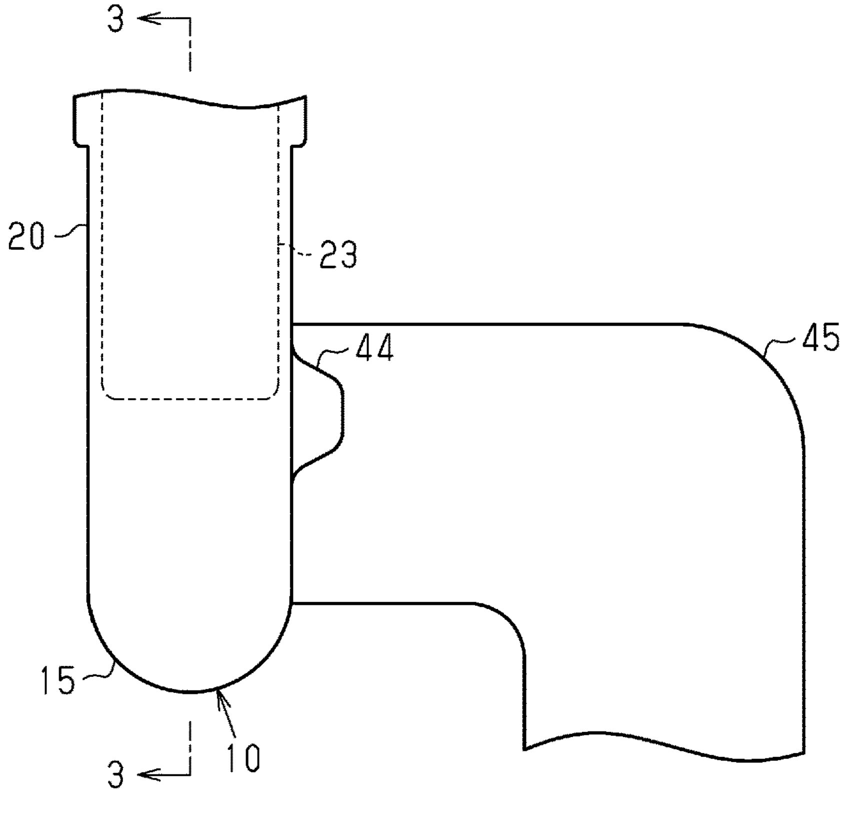
FIG. 2 is a side view of the forced-induction device of FIG. 1.

As shown in FIGS. 1 and 2, the forced-induction device 10 is connected to the exhaust passage 45. The three-way catalyst 46 is connected to the downstream side of the exhaust passage 45.

The intake air flows into the compressor housing 12 of the forced-induction device 10 through the air cleaner 40 and the first intake passage 41. The intake air is compressed by a compressor wheel 11 provided in the compressor housing 12. The compressed intake air passes through the second intake passage 42 and the intercooler 43 and flows into the intake manifold 33.

The exhaust gas discharged from the internal combustion engine 30 passes through the first exhaust port 31 or the second exhaust port 32 and flows into the turbine housing 15 of the forced-induction device 10. The exhaust gas flowing into the turbine housing 15 rotates the turbine wheel 14 provided in the turbine housing 15. The exhaust gas flowing into the turbine housing 15 passes through the exhaust passage 45 and the three-way catalyst 46 and is discharged to the outside.

<Forced-Induction Device 10>

As shown in FIGS. 1 and 2, the forced-induction device 10 includes the compressor wheel 11, the compressor housing 12, a coupling shaft 13, the turbine wheel 14, the turbine housing 15, and a connection pipe 20.

The compressor housing 12 accommodates the compressor wheel 11. The first intake passage 41 and the second intake passage 42 are connected to the compressor housing 12.

Figure 3:
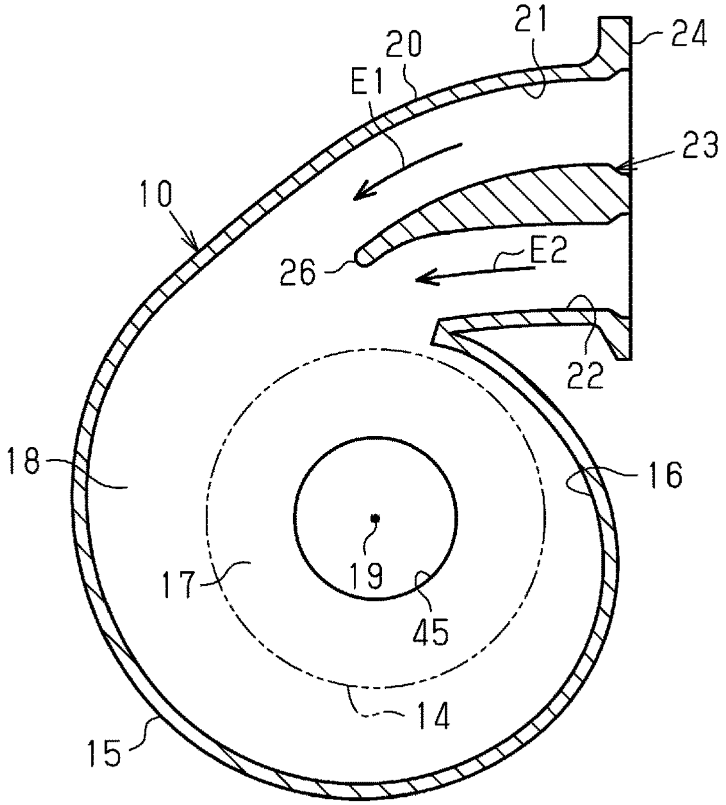
FIG. 3 is a cross-sectional view taken along line 3-3 of FIG. 2.

As shown in FIG. 3, the connection pipe 20 includes a first passage 21, a second passage 22, a partition wall 23, and a contact surface 24. The connection pipe 20 connects the turbine housing 15 and the internal combustion engine 30 to each other. The connection pipe 20 is in contact with the internal combustion engine 30 at the contact surface 24. The connection pipe 20 is curved between the turbine housing 15 and the internal combustion engine 30. In the vicinity of the contact surface 24, the connection pipe 20 extends in a direction perpendicular to the contact surface 24. The partition wall 23 divides the inside of the connection pipe 20 into the first passage 21 and the second passage 22. The first passage 21 and the second passage 22 communicate with the first exhaust port 31 and the second exhaust port 32, respectively. FIG. 3 shows a specified cross section which is a cross section orthogonal to the rotation axis of the turbine wheel 14 and in which the cross-sectional flow area of a scroll passage 18 is the largest.

Figure 4:
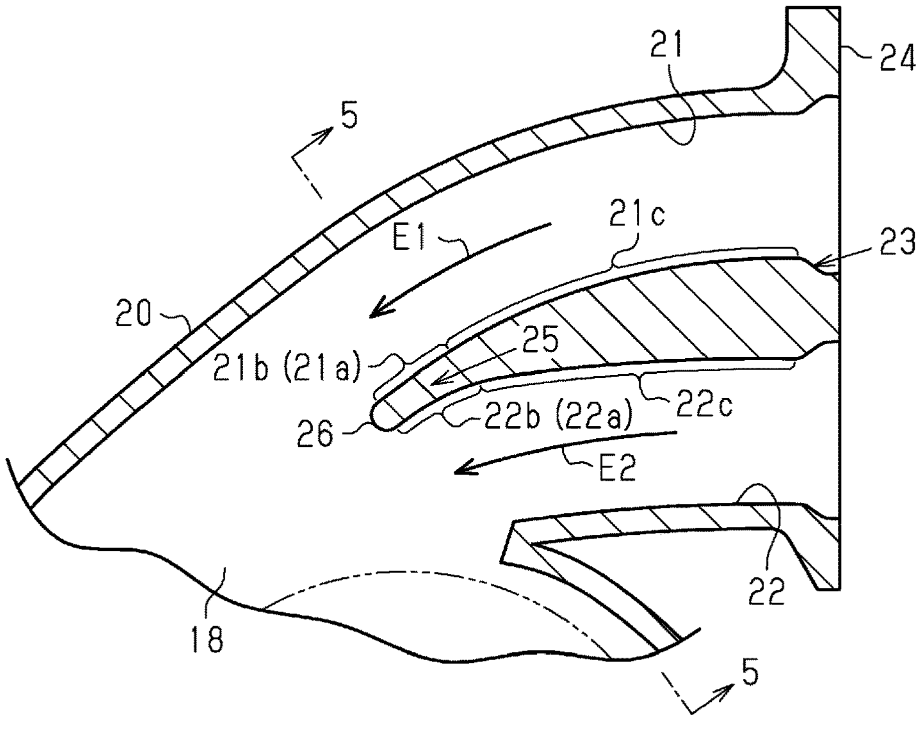
FIG. 4 is an enlarged cross-sectional view of the vicinity of a connection pipe of the forced-induction device of FIG. 3.

As shown in FIGS. 3 and 4, when a flow direction of a first exhaust gas flow E1 in the first passage 21 and a flow direction of a second exhaust gas flow E2 in the second passage 22 are defined as flow directions of exhaust gas in the connection pipe 20, the partition wall 23 extends from the contact surface 24 in the flow direction of the exhaust gas in the connection pipe 20.

In the present specification, a first downstream line segment **21*b* and a second downstream line segment 22*b* are defined as follows. As shown in FIG. 4, the first downstream line segment 21*b* extends from a distal end 26 of the partition wall 23 toward the upstream side in the flow direction of the first exhaust gas flow E1, and defines the boundary between the first passage 21 and the partition wall 23. The second downstream line segment 22*b* extends from the distal end 26 of the partition wall 23 toward the upstream side in the flow direction of the second exhaust gas flow E2, and defines the boundary between the second passage 22 and the partition wall 23. The first downstream line segment 21*b* and the second downstream line segment 22*b*** are parallel to each other.

Figure 5:
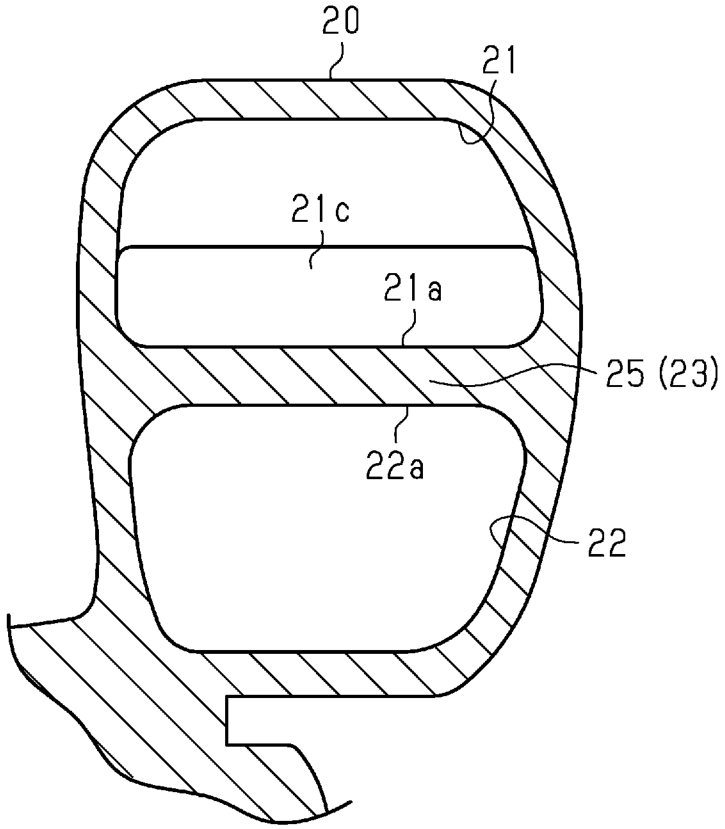
FIG. 5 is a cross-sectional view taken along line 5-5 of FIG. 4.

As shown in FIGS. 4 and 5, a surface including the first downstream line segment **21*b* in the partition wall 23 is referred to as a first surface 21*a*. A surface including the second downstream line segment 22*b* in the partition wall 23 is referred to as a second surface 22*a*. The first surface 21*a* and the second surface 22*a* face each other with the partition wall 23 interposed therebetween. The first surface 21*a* and the second surface 22*a*** are flat surfaces and are parallel to each other.

A portion of the partition wall 23 sandwiched between the first surface **21*a* and the second surface 22*a* is referred to as a downstream portion 25. Portions of the first passage 21 and the second passage 22 adjacent to each other with the downstream portion 25** interposed therebetween have the same cross-sectional flow area.

As shown in FIG. 4, the partition wall 23 has a first upstream line segment **21*c* and a second upstream line segment 22*c*. The first upstream line segment 21*c* is connected to the first downstream line segment 21*b*, and extends toward the contact surface 24 of the connection pipe 20. The second upstream line segment 22*c* is connected to the second downstream line segment 22*b*, and extends toward the contact surface 24. The first upstream line segment 21*c* is inclined with respect to the second upstream line segment 22*c* such that the distance between the first upstream line segment 21*c* and the second upstream line segment 22*c* increases toward the contact surface 24**.

As shown in FIG. 3, the turbine housing 15 has a substantially circular shape in a cross-sectional view. The turbine housing 15 accommodates the turbine wheel 14, which has a substantially circular shape in a cross-sectional view. The turbine wheel 14 has a rotation center 19. An imaginary line passing through the rotation center 19 and extending in a direction orthogonal to the cross-section shown in FIG. 3 is a rotation axis.

As shown in FIG. 1, the compressor wheel 11 and the turbine wheel 14 are coupled to each other by the coupling shaft 13.

As shown in FIG. 3, the turbine housing 15 includes the scroll passage 18, which extends in the circumferential direction of the turbine wheel 14 between an inner wall 16 of the turbine housing 15 and an outer circumferential surface 17 of the turbine wheel 14. The scroll passage 18 is a passage that communicates with the first passage 21 and the second passage 22 of the connection pipe 20, and is a passage in which the first exhaust gas flow E1 and the second exhaust gas flow E2 merge with each other.

As shown in FIGS. 1 and 2, a bypass passage 44 is provided in the turbine housing 15. The bypass passage 44 extends from the turbine housing 15 to the exhaust passage 45. A wastegate valve 44*a* is provided in the bypass passage 44. Exhaust gas bypasses the turbine wheel 14 by flowing through the bypass passage 44.

Operation of this embodiment will be described.

Since exhaust gas is intermittently discharged from the internal combustion engine 30 to the first exhaust port 31 and the second exhaust port 32, the pressure in the first exhaust port 31 and the pressure in the second exhaust port 32 periodically change to generate pressure pulsation. Further, since the timings at which the exhaust gas is discharged from the internal combustion engine 30 to the first exhaust port 31 and the second exhaust port 32 are different from each other, a difference occurs between the pressure in the first exhaust port 31 and the pressure in the second exhaust port 32 at the same point in time. Therefore, when the pressure in the first exhaust port 31 is higher than the pressure in the second exhaust port 32, the exhaust gas discharged from the first exhaust port 31 to the connection pipe 20 may flow back to the second exhaust port 32. When the pressure in the second exhaust port 32 is higher than the pressure in the first exhaust port 31, the exhaust gas discharged from the second exhaust port 32 to the connection pipe 20 may flow back to the first exhaust port 31.

According to the above configuration, the connection pipe 20 includes the partition wall 23, which partitions the inside of the connection pipe 20 into the first passage 21 communicating with the first exhaust port 31 and the second passage 22 communicating with the second exhaust port 32. Therefore, a backflow of the exhaust gas from the first exhaust port 31 to the second exhaust port 32 and a backflow of the exhaust gas from the second exhaust port 32 to the first exhaust port 31 are less likely to occur.

Figure 6:
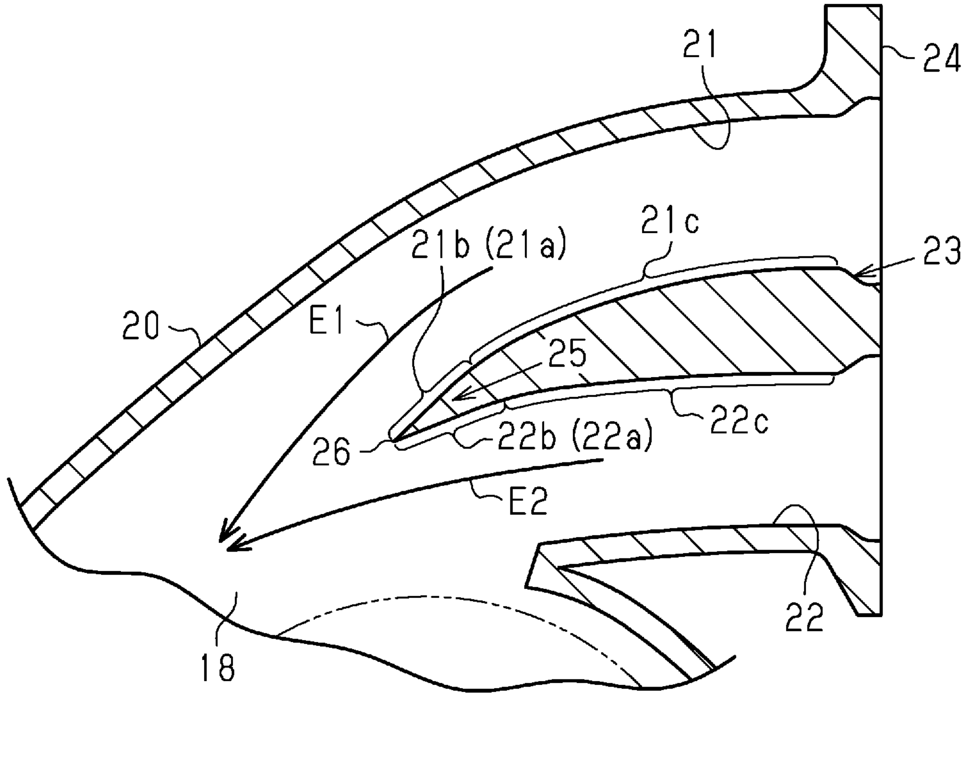
FIG. 6 is an enlarged cross-sectional view of the vicinity of the connection pipe in a case in which a first downstream line segment and a second downstream line segment of the forced-induction device are not parallel to each other.

As shown in FIG. 6, when the first downstream line segment 21*b* and the second downstream line segment 22*b* of the partition wall 23 are not parallel to each other, the following problem may occur. When the first exhaust gas flow E1 and the second exhaust gas flow E2 merge with each other in the scroll passage 18, the flow directions of the first exhaust gas flow E1 and the second exhaust gas flow E2 are different from each other. Therefore, the first exhaust gas flow E1 and the second exhaust gas flow E2 may interfere with each other, and the flow velocity of the exhaust gas in the scroll passage 18 may decrease. As a result, the first exhaust gas flow E1 and the second exhaust gas flow E2 tend to flow back to the lower-pressure one of the first passage 21 and the second passage 22. Therefore, the above-described effect of suppressing backflow of the exhaust gas is reduced.

According to the above configuration, the first exhaust gas flow E1 and the second exhaust gas flow E2 readily become parallel to each other, and the first exhaust gas flow E1 and the second exhaust gas flow E2 are unlikely to interfere with each other. Further, according to the above configuration, the first exhaust gas flow E1 and the second exhaust gas flow E2 flow in a state of being close to each other. Therefore, when the flow velocity of the first exhaust gas flow E1 is higher than the flow velocity of the second exhaust gas flow E2, the second exhaust gas flow E2 is drawn to the first exhaust gas flow E1. When the flow velocity of the second exhaust gas flow E2 is higher than the flow velocity of the first exhaust gas flow E1, the first exhaust gas flow E1 is drawn to the second exhaust gas flow E2. Therefore, the above-described backflow of exhaust gas is suppressed further effectively. In the present specification, a phenomenon in which, of the first exhaust gas flow E1 and the second exhaust gas flow E2, the flow having the lower flow velocity is drawn to the flow having the higher flow velocity is referred to as the "Venturi effect."

The present embodiment achieves the following advantages.

(1) The first downstream line segment 21*b* and the second downstream line segment 22*b* are parallel to each other.

According to such a configuration, since the above-described operation is ensured, it is possible to suppress the above-described backflow of exhaust gas.

(2) The engine 30 has the cylinders C1, C2, C3, and C4 in which combustion stroke occurs in the order of the cylinders C1, C3, C4, and C2. The first cylinders include the cylinder C1 and the cylinder C4. The second cylinders include the cylinder C2 and the cylinder C3.

Unlike the above configuration, for example, in a configuration in which the first cylinders are the cylinders C1 and C3 and the second cylinders are the cylinders C4 and C2, the following problem occurs. Since exhaust gas is continuously introduced into the first exhaust port 31 from the cylinders C1 and C3 in a certain period of time, the pressure of the first exhaust gas flow E1 becomes higher than the pressure of the second exhaust gas flow E2, and the pressure difference between the exhaust gas flows E1 and E2 also becomes large. Similarly, since exhaust gas is continuously introduced into the second exhaust port 32 from the cylinders C4 and C2 in another period, the pressure of the second exhaust gas flow E2 becomes higher than the pressure of the first exhaust gas flow E1, and the pressure difference between the exhaust gas flows E1 and E2 also becomes large. Therefore, the above-described backflow of the exhaust gas is likely to occur.

In this regard, according to the above-described configuration, since the exhaust gas alternately flows through the first passage 21 and the second passage 22, the above-described backflow of exhaust gas is suppressed. Therefore, the exhaust gas easily flows from the first passage 21 and the second passage 22 to the scroll passage 18.

(3) The first surface 21*a* and the second surface 22*a* are parallel to each other.

According to such a configuration, the amount of exhaust gas flowing adjacent to each other increases in the first exhaust gas flow E1 and the second exhaust gas flow E2, and which increases the Venturi effect.

(4) The cross-sectional flow areas of the portions of the first passage 21 and the second passage 22 that are adjacent to each other with the downstream portion 25 interposed therebetween are equal to each other.

According to such a configuration, a difference is unlikely to occur between the force with which the first exhaust gas flow E1 contributes to rotation of the turbine wheel 14 and the force with which the second exhaust gas flow E2 contributes to rotation of the turbine wheel 14. Therefore, the speed at which the turbine wheel 14 rotates tends to be constant. Therefore, pulsation of the boost pressure is unlikely to occur.

MODIFICATIONS

The present embodiment may be modified as follows. The present embodiment and the following modifications can be implemented in combination with each other as long as there is no technical contradiction.

The cross-sectional flow area of the first passage 21 and the cross-sectional flow area of the second passage 22, which are adjacent to each other with the downstream portion 25 interposed therebetween, may be different from each other.

In this description, when the cross-sectional flow area of the first passage 21 is represented by S1 and the cross-sectional flow area of the second passage 22 is represented by S2, the case in which S1 and S2 are equal to each other includes the following case. That is, in addition to the case in which S1 and S2 are completely equal to each other, a case in which $0.9 \leq S1/S2 \leq 1.1$ is satisfied is included.

The first upstream line segment 21*c* and the second upstream line segment 22*c* may be parallel to each other.

In the present specification, "parallel" is not limited to parallel in a strict sense. That is, a case in which the second downstream line segment 22*b* is inclined with respect to the first downstream line segment 21*b* within a range in which the flow direction of the first exhaust gas flow E1 and the flow direction of the second exhaust gas flow E2 can be regarded as parallel is also included in "parallel" in the present specification.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A forced-induction device for an internal combustion engine, wherein the internal combustion engine includes:

a first cylinder and a second cylinder having a different timing of a combustion stroke from the first cylinder; and a first exhaust port connected to the first cylinder and a second exhaust port connected to the second cylinder, the forced-induction device comprises:

a turbine wheel;

a turbine housing that accommodates the turbine wheel; and a connection pipe that connects the turbine housing and the internal combustion engine to each other, the connection pipe includes:

a contact surface that is in contact with the internal combustion engine;

a first passage communicating with the first exhaust port;

a second passage communicating with the second exhaust port; and a partition wall extending from the contact surface and partitioning an interior of the connection pipe into the first passage and the second passage, the turbine housing includes a scroll passage extending in a circumferential direction of the turbine wheel between an inner wall of the turbine housing and an outer circumferential surface of the turbine wheel, the scroll passage communicates with the first passage and the second passage such that exhaust gas that has passed through the first passage and exhaust gas that has passed through the second passage merge with each other, a specified cross section is defined as a cross-section orthogonal to a rotation axis of the turbine wheel and having a largest cross-sectional flow area of the scroll passage, and when the specified cross section is viewed a line segment extending from a distal end of the partition wall toward an upstream side in a flow direction of exhaust gas in the first passage and defining a boundary between the first passage and the partition wall is a first downstream line segment, and a line segment extending from the distal end toward an upstream side in a flow direction of exhaust gas in the second passage and defining a boundary between the second passage and the partition wall is a second downstream line segment, the first downstream line segment and the second downstream line segment are parallel to each other, the partition wall includes:

a first upstream line segment connected to the first downstream line segment and extending toward the contact surface of the connection pipe; and a second upstream line segment connected to the second downstream line segment and extending toward the contact surface, and when the specified cross section is viewed the first upstream line segment is inclined with respect to the second upstream line segment such that a distance between the first upstream line segment and the second upstream line segment increases toward the contact surface.

2. The forced-induction device according to claim 1, wherein the internal combustion engine includes four cylinders, the first cylinder is one of a cylinder in which a combustion stroke occurs first and a cylinder in which the combustion stroke occurs third, and the second cylinder is one of a cylinder in which the combustion stroke occurs second and a cylinder in which the combustion stroke occurs fourth.

3. The forced-induction device according to claim 1, wherein the partition wall includes a first surface including the first downstream line segment and a second surface including the second downstream line segment, and the first surface and the second surface are parallel to each other.

4. The forced-induction device according to claim 3, wherein a portion of the partition wall sandwiched between the first surface and the second surface is a downstream portion, and when the specified cross section is viewed, cross-sectional flow areas of portions of the first passage and the second passage that are adjacent to each other with the downstream portion interposed therebetween are equal to each other.

* * * * *